United States Patent Office 3,166,665
Patented Jan. 19, 1965

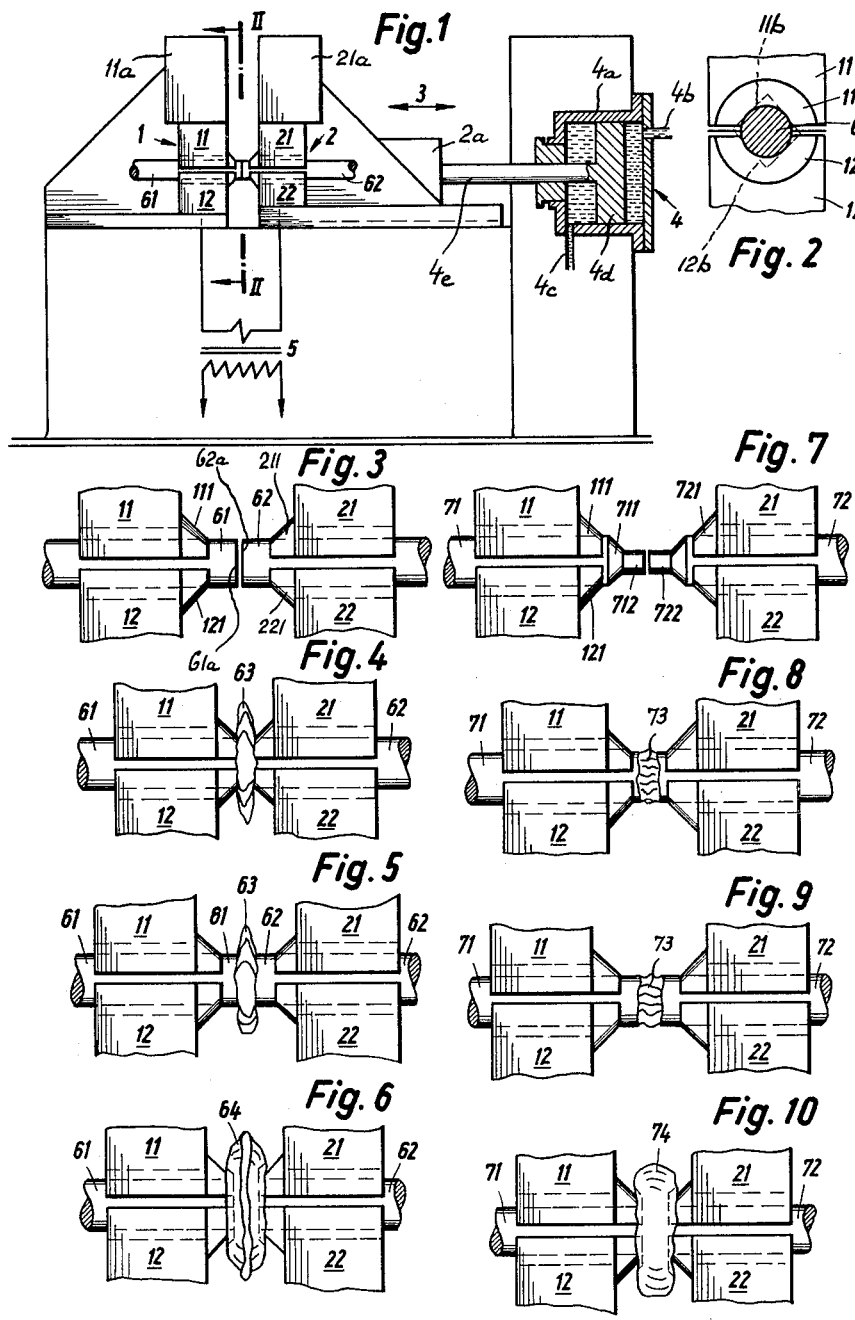

3,166,665
METHOD OF BUTT WELDING OF METALLIC WORKPIECES
Alfred Neukom, Dubendorf, Zurich, Rolf Suter, Meilen, Zurich, and Josef Widmer, Spreitenbach, Aargau, Switzerland, assignors to H. A. Schlatter A.G., Zollikon, Zurich, Switzerland
Filed June 11, 1962, Ser. No. 201,730
9 Claims. (Cl. 219—104)

The present invention relates to the art of welding in general, and more particularly to a method of and to an apparatus for upset butt welding of metallic workpieces, especially such workpieces which consist of non-ferrous material.

It is an important object of the present invention to provide a method of welding pairs of metallic workpieces in such a way that the metallurgical structure of the entire ultimate product is the same as the metallurgical structure of the workpieces prior to welding.

Another object of the invention is to provide a very simple and reliable method of forming welded joints between the ends of metallic workpieces of non-ferrous material, particularly copper and its alloys according to which one can produce a welded joint exhibiting exceptionally satisfactory strength characteristics.

A further object of the invention is to provide a method of upset butt welding metallic workpieces according to which the upsetting operation is carried out in several stages and in such a manner that, upon removal of the weld, the joint between the workpieces exhibits a metallurgical structure which is identical with the structure of the remainder of the workpieces.

An additional object of the invention is to provide an apparatus for the practice of the above outlined method.

A concomitant object of the invention is to provide a welded structure which is obtained by resorting to a method of the above outlined characteristics.

With the above objects in view, the invention resides in the provision of a method of forming a welded joint between a pair of metallic workpieces which comprises the steps of placing the workpieces in end-to-end abutment with each other, passing an electric current through the abutting ends of the workpieces to thereby heat to fusion temperature such end portions of the workpieces which are adjacent to the respective ends whereby the metallurgical structure of the end portions changes, and subjecting at least one of the workpieces to a compressive force acting in a direction to upset the end portions and to form a weld surrounding a joint between the workpieces and containing at least the major part of the material of the end portions so that, upon removal of the weld, at least the major part of the joint consists of metallic material whose metallurgical structure is the same as the structure of the remainder of the workpieces.

In accordance with a feature of our invention, the application of compressive forces is carried out in two stages after the first of which the end portions of the workpieces form a comparatively small weld and after the second of which the diameter of the substantially mushroom-shaped weld is increased to the extent necessary to expel from the ultimate joint all or nearly all such material whose metallurgical structure was changed at fusion temperature. Depending on the material of the workpieces and on the desired characteristics of the joint, the second upsetting or forging step is carried out (a) while the end portions are still hot subsequent to heating to fusion temperature, (b) after the end portions are cooled to room temperature, or (c) subsequent to postheating to a temperature higher than room temperature but lower than fusion temperature of the workpieces.

The novel features which are considered as characteristic of the invention are set forth in particular in the appended claims. The invention itself, however, both as to its construction and its method of operation, together with additional objects and advantages thereof, will be best understood from the following detailed description of certain specific embodiments with reference to the accompanying drawings, in which:

FIG. 1 is a schematic front elevational view of a welding apparatus which embodies our invention;

FIG. 2 is an enlarged fragmentary transverse section as seen in the direction of arrows from the line II—II of FIG. 1;

FIG. 3 is an enlarged elevational view of the actual welding station which forms part of the apparatus shown in FIGS. 1 and 2, showing two round workpieces in positions they assume at the start of a welding operation;

FIG. 4 is a similar view of the welding station, showing the weld which is formed about the joint between the workpieces as a result of the first upsetting step;

FIG. 5 illustrates the workpieces in a position they assume after the jaws of the dies are moved apart subsequent to completion of the first upsetting step;

FIG. 6 illustrates the welding station of FIGS. 3–5 and the enlarged weld which is formed as a result of the application of a second compressive or upsetting force;

FIG. 7 illustrates the welding station of FIGS. 3 to 6 and a pair of modified workpieces whose end portions are turned down so that they assume a partly cylindrical and partly conical shape;

FIG. 8 illustrates the weld which is formed by the end portions of the workpieces shown in FIG. 7 as a result of the application of an initial compressive or upsetting force;

FIG. 9 shows the workpieces of FIGS. 7 and 8 in a position they assume after the dies of the welding machine are moved apart preparatory to the application of a second compressive force; and FIG. 10 illustrates the ultimate product as it appears after the end portions of the workpieces shown in FIGS. 7 to 9 were subjected to a second compressive or upsetting force.

Referring now in greater detail to the illustrated embodiments, and first to FIG. 1, there is shown a welding apparatus which includes a support or base S and a pair of dies 1, 2 which are mounted on the support. The die 1 is fixed but the die 2 is reciprocable along the support in directions indicated by the double-headed arrow 3. The die 1 comprises a stationary jaw 12 and a vertically reciprocable jaw 11, the latter movable into firm clamping engagement with a round workpiece 61 which is placed between the jaws 11, 12. The die 2 comprises a lower jaw 22 and a vertically reciprocable upper jaw 21 which may be moved into firm clamping engagement with a second round workpiece 62. The means 11a for reciprocating the jaw 11 may assume the form of a suitable hydraulic cylinder-and-piston assembly which can generate the force necessary to prevent axial movements of the workpiece 61. A similar reciprocating means 21a is provided for the jaw 21. The dies 1, 2 are connected to the terminals of a secondary forming part of a welding transformer 5 which heats the abutting end portions of the workpieces 61, 62 to fusion temperature.

The means for reciprocating the die 2 toward and away from the die 1 comprises a double-acting hydraulic cylinder-and-piston assembly 4 including a cylinder 4a connected with conduits 4b, 4c which are located at the opposite sides of a piston 4d, the latter reciprocable in the cylinder 4a and provided with a piston rod 4e which is connected to an extension 2a of the die 2.

As shown in FIG. 2, the jaws 11, 12 are formed with V-shaped cutouts 11b, 12b which define a square opening when the jaws are adjacent to each other. These jaws are provided with work-engaging portions 111, 121 whose cross-sectional areas diminish in a direction away from the respective jaws. The portions 111, 121 together form a composite hollow cone which surround and firmly engages the workpiece 61 near to the end face 61a thereof. The configuration of the jaws 21, 22 is identical, and these jaws are provided with work-engaging portions 211, 221 which are shown in FIG. 3. The portions 211, 221 grip the workpiece 62 near to the end face 62a thereof.

Of course, when the round workpieces 61, 62 are replaced by workpieces of square, hexagonal or other polygonal cross section, the apparatus of FIG. 1 utilizes different jaws whose work-engaging portions preferably assume the form of wedges having internal faces in firm engagement with external faces of such polygonal workpieces.

FIGS. 3 to 6 illustrate one type of an upset butt welding operation which can be carried out in the resistance welding apparatus of FIG. 1. It is assumed that the workpieces 61, 62 consist of round copper stock with a diameter of 19 mm., with a tensile strength of 24 kg./mm.$^2$ and with an elastic limit of 12.5 kg./mm.$^2$ (in cold condition of the material). It is also assumed that the end faces 61a, 62a of the workpieces are untreated.

In the first step, the end faces 61a, 62a are pressed against each other in response to admission of pressure fluid through the conduit 4b, and the workpieces 61, 62 are preheated by pulsating current, namely, ten impulses applied at intervals of 0.15 sec. and each having a duration of 0.3 sec. The current strength is 150 amp./mm.$^2$ of a workpiece.

In the next step, the end portions immediately adjacent to the end faces 61a, 62a are forged by moving the workpiece 62 through a distance of 20 mm. in a direction toward the workpiece 61 within a period of one-half of a second. During such forging step, the current strength is about half the current strength in the preceding preheating step. This is due to the fact that molten metal forms irregular bridges for the flow of current and also because the formation of flash flame is unpredictable.

In an immediately following third step, the current strength is increased to 200 amp./mm.$^2$ and the workpiece 62 is advanced through a distance of 16 mm. while being subjected to a first axially oriented compressing or upsetting force of 25 kg./mm.$^2$. FIG. 4 illustrates the weld 63 which is formed when the first upsetting step is completed.

Since the workpieces are subjected to considerable axial stresses, the portions 111, 121 and 211, 221 must engage the workpieces in close proximity of the end faces 61a, 62a, respectively in order to avoid buckling of the material. Consequently, and since the workpiece 62 has now been advanced through a distance of 36 mm., it is necessary to disengage the jaws by actuating the reciprocating means 11a, 21a and to reengage the workpieces at points somewhat more distant from the weld 63. After the jaws 11, 12 and 21, 22 reengage the workpieces 61, 62, they assume positions which are illustrated in FIG. 5. FIG. 4 shows that, after the die 2 has been moved through a distance of 36 mm., the conical portions 111, 121 and 211, 221 are immediately adjacent to the weld 63.

In order to engage the workpieces 61, 62 in a manner as shown in FIG. 5, the operator first causes the jaws 11, 21 to move in upward direction and thereupon admits pressure fluid through the conduit 4c so as to retract the die 2 through a distance of about 10 mm. The weld 63 surrounds a joint between the workpieces 61, 62 so that the unitary structure consisting of parts 61–63 may be shifted in a direction to the right, as viewed in FIG. 4, until the weld 63 reaches a position midway between the dies 1, 2. The operator thereupon causes the jaws 11, 21 to move in downward direction and to clamp the respective workpieces in the position of FIG. 5.

In a subsequent postheating step, a current of 200 amp./mm.$^2$ is passed through the workpieces for a period of 3.5 sec., and the die 2 is moved through a distance of 10–12 mm. in a direction toward the die 1. During such forward movement of the die 2, the current strength (but not the current density) increases because the cross-sectional area of the joint also increases and because the impedance of the apparatus decreases in response to movement of the die 2 toward the die 1. However, the workpieces are not heated to welding temperature because the resistance of the joint to flow of electric current is much less than the resistance which the workpieces offer before the weld 63 is formed. Owing to renewed axial displacement of the die 2, the workpieces are subjected to a second compressive or upsetting force and additional material is expelled radially outwardly so that the weld grows and assumes a form which is identified in FIG. 6 by a reference numeral 64. The material of the workpieces 61, 62 which is immediately adjacent to the final weld 64 is subjected to plastic deformation and attendant heating but not to fusion or welding temperatures. Consequently, the welded structure consisting of the workpieces 61, 62 and of the weld 64 now assumes the form of a one-piece bar wherein the metallurgical structure is the same as before the welding operation, excepting of course the metallurgical structure of the weld 64 which is removed in a subsequent operation, as by turning, chipping, grinding, sanding or in another suitable manner. In other words, the actual welding or joining step is followed by a multi-stage upsetting operation during which one of the workpieces moves in the axial direction thereof to such an extent that all material whose metallurgical structure has changed during heating to fusion temperature is expelled radially outwardly and forms the weld 64 so that the ultimate product (subsequent to removal of the upset 64) contains only or mainly such material whose metallurgical structure is the same as the structure of the workpieces 61, 62 prior to welding because the final upsetting step brings together two portions of the workpieces 61, 62 which were never heated to fusion temperature and which were subjected to plastic deformation at temperatures well below the fusion temperature.

Of course, the above described upset butt welding operation can be carried out by utilizing currents of lesser density, for example, 100 amp./mm.$^2$; however, the operation then requires more time.

If the current supply of the welding apparatus is inadequate and the apparatus cannot furnish a current of requisite density, the cross-sectional areas of the end portions of the workpieces are reduced by machining in a manner as shown in FIG. 7. The workpiece 71 is provided with a composite end portion of reduced diameter and this end portion includes a constant-diameter cylindrical tip 712 and a conical intermediate section 711. The other workpiece 72 comprises a conical intermediate section 721 and a cylindrical tip 722. For example, if the diameter of the workpiece 71 or 72 is 19 mm., the diameter of the tip 712 or 722 is between 8–10 mm. and the inclination of the mantle of the intermediate section 711 or 721 with respect to the axis of the respective workpiece is about 45 degrees. The axial length of the tip 712 or 722 is between 8–10 mm.

In the initial step, the end portions 711, 712 and 721, 722 are heated to fusion temperature and the die 2 is moved in a direction to the left, as viewed in FIG. 7, to apply an initial compressive or upsetting force until the diameter of the weld 73 (see FIG. 8) approximates the diameters of the remainder of the workpieces (i.e. circa 19 mm.). In the next step, the joined workpieces are released and the die 2 is moved away from the die 1 (FIG. 9). After the workpieces are reengaged by the jaws 11, 12 and 21, 22 in such a way that the weld 73 is located substantially midway between the conical portions 111, 121 and 211, 221, the die 2 is again moved in a direction to the left, as viewed in FIG. 9, and the material which was previously heated to fusion temperature is expelled radially outwardly to form a final weld 74 which is shown in FIG. 10. After the weld 74 is removed, the welded structure consists of a material whose metallurgical structure is uniform throughout because all or nearly all material which was heated to fusion temperature was removed by removal of the weld 74.

The distance which the movable die 2 must cover in a direction toward the fixed die in order to expel the remainder of material which was heated to fusion temperature must be at least 0.4 times the diameter of the end portion of a round workpiece. If the cross sections of the workpieces do not deviate too much from circular shape (i.e., if the workpieces are of polygonal shape), the distance which the movable die must cover in order to expel the remainder of such material which was heated to fusion temperature may be determined by dividing the absolute value of the cross-sectional area of an end portion with the absolute value of the circumferential length of the same end portion and by multiplying the resulting quotient by 1.6. Thus, if the workpiece is of square cross section and if each of its sides is 20 mm., the displacement of the die 2 toward the die 1 is 8 mm. or more. If one desires to be safe, one or more experimental welding operations may be carried out to determine the optimum length of axial displacements of one workpiece toward the other workpiece in order to expel all such material whose metallurgical structure has been changed in response to heating to fusion or welding temperature. Such tests will also show whether it is advisable to postheat the workpieces prior to final upsetting or whether such final upsetting should be carried out without any additional heating, i.e., at room temperature.

In order that the heating action remain limited to the actual welding zone, it is advisable to cool the dies 1 and 2 by circulating fluids or in any other suitable manner. In some instances not only the dies but also certain other parts of the welding apparatus should be cooled to insure that the heating action is limited mainly to such portions of the workpieces which are located between the dies.

An important advantage of dies whose work-engaging portions are configured in such a way that their cross-sectional areas diminish in a direction toward each other is that such work-engaging portion can grip the workpieces in close proximity of the end faces along which the joint is formed. It will be readily understood that, if the portions 111, 121 and 211, 221 were of cylindrical shape, more power would be necessary to form the weld 63 or 64 because such cylindrical work-engaging portions would come into face-to-face abutment with the weld. As shown in FIG. 6, the mushroom-shaped weld 64 actually overlaps the conical outer sides of the intermediate sections 111, 121 and 211, 221. Consequently, the distance between the portions 111, 121 and 211, 221 prior to the final upsetting step need not exceed the distance which the die 2 covers in order to transform the weld 63 of FIG. 5 into a weld 64. Such configuration of the work-engaging portions is of equal advantage if the final upsetting step takes place with or without heating of the workpieces.

It will be noted that we provide a novel process for upset butt welding of metallic workpieces which insures that the metallurgical structure of the ultimate product is the same as the metallurgical structure of the original workpieces because all or nearly all such material whose metallurgical structure has changed is removed with the weld 64 or 74. Such expulsion of material with altered metallurgical structure can be carried out at elevated or at normal temperatures, i.e., the zones which are immediately adjacent to the weld 63 or 73 may but need not be in plastic condition when the final upsetting step takes place.

It will also be noted that, what we call an upset butt welding operation may actually constitute a combined butt welding and flash welding operation since, in pure butt welding, the end faces of the workpieces are normally treated to make sure that they are in satisfactory face-to-face abutment with each other. On the other hand, flash welding may be resorted to even if the end faces of the workpieces are not subjected to a preliminary treatment. The example described in connection with FIGS. 3 to 6 is actually a combined flash welding and upset butt welding operation, and the same applies to the example of FIGS. 7 to 10. As is known, in a flash welding operation the end portions are brought into loose contact with each other and are heated by electric current whose density is extremely high because the combined area of contact between the workpieces is rather small, particularly if the end faces of such end portions are not subjected to a preliminary smoothing operation.

When the actual welding operation in accordance with our method is carried out subsequent to preheating of the workpieces, the end portions of the workpieces are first heated to red heat before being subjected to heat necessary to melt such end portions and before the application of upsetting forces.

When the workpieces 61, 62 are subjected to a first compressive force to form the weld 63, the temperature of the end portions of these workpieces is in the range of 970 to 1010° C. At the time these workpieces are subjected to the next compressive action to form the weld 64, the temperature of their end portions is in the range of 750 to 850° C.

When according to our method workpieces of copper alloys (e.g. bronze or brass) or other non-ferrous materials are subjected to a first compressive force to form a weld corresponding to the weld 63, the temperature of the end portions of these workpieces may be about 10 to 100° C. below the melting or fusing point of the material. At the time these workpieces are subjected to the next compressive action to form a weld corresponding to weld 64, the joined end portions may be heated or not, as explained above.

It is to be noted that the steps of our method up to the step of subjecting the workpieces to a first compressive force to form the weld 63 may be carried out according to the well known upset butt welding operation as well as according to the well known flash welding operation.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A method of forming a welded joint between a pair of metallic workpieces, comprising the steps of clamping each workpiece closely adjacent one end thereof; placing the workpieces at the clamped ends thereof in end-to-end abutment with each other; passing an electric current through the abutting ends of the workpieces to thereby heat to fusion temperature such end portions of the workpieces which are immediately adjacent to the abutting ends thereof whereby the metallurgical structure of the end portions of the workpieces changes; subjecting at least one of the workpieces to a first compressive force acting in a direction to upset the end portions and to form a welding flash which surrounds a joint between the workpieces; reclamping said workpieces at portions thereof spaced further from said welding flash; and subjecting at least one of the workpieces to a second compressive force acting in a direction to further upset the end portions of the workpieces and to thereby enlarge the welding flash so that, upon removal of the welding flash, at least the major part of the joint consists of metallic material whose metallurgical structure is the same as the metallurgical structure of the remainder of the workpieces.

2. A method of forming a welded joint between a pair of metallic workpieces, comprising the steps of clamping each workpiece closely adjacent one end thereof; placing the workpieces at the clamped ends thereof in end-to-end abutment with each other; passing an electric current through the abutting ends of the workpieces to thereby heat to fusion temperature such end portions of the workpieces which are immediately adjacent to the abutting ends thereof whereby the metallurgical structure of the end portions of the workpieces changes; subjecting at least one of the workpieces to a first compressive force acting in a direction to upset the end portions and to form a welding flash which surrounds a joint between the workpieces; maintaining the end portions at a temperature which is higher than room temperature but less than the fusion temperature of the workpieces; reclamping said workpieces at portions thereof spaced further from said welding flash; and subjecting at least one of the workpieces to a second compressive force acting in a direction to further upset the end portions of the workpieces and to thereby enlarge the welding flash so that, upon removal of the welding flash, at least the major part of the joint consists of metallic material whose metallurgical structure is the same as the metallurgical structure of the remainder of the workpieces.

3. A method of forming a welded joint between a pair of metallic workpieces, comprising the steps of clamping each workpiece closely adjacent one end thereof; placing the workpieces at the clamped ends thereof in end-to-end abutment with each other; passing an electric current through the abutting ends of the workpieces to thereby heat to fusion temperature such end portions of the workpieces which are immediately adjacent to the abutting ends thereof whereby the metallurgical structure of the end portions of the workpieces changes; subjecting at least one of the workpieces to a first compressive force acting in a direction to upset the end portions and to form a welding flash which surrounds a joint between the workpieces; cooling the end portions of the workpieces to room temperature; reclamping said workpieces at portions thereof spaced further from said welding flash; and subjecting at least one of the workpieces to a second compressive force acting in a direction to further upset the end portions of the workpieces and to thereby enlarge the welding flash so that, upon removal of the welding flash, at least the major part of the joint consists of metallic material whose metallurgical structure is the same as the metallurgical structure of the remainder of the workpieces.

4. A method of forming a welded joint between a pair of metallic workpieces, comprising the steps of clamping each workpiece closely adjacent one end thereof; placing the workpieces at the clamped ends thereof in end-to-end abutment with each other; passing an electric current through the abutting ends of the workpieces to thereby heat to fusion temperature such end portions of the workpieces which are immediately adjacent to the abutting ends thereof whereby the metallurgical structure of the end portions of the workpieces changes; subjecting at least one of the workpieces to a first compressive force acting in a direction to upset the end portions and to form a welding flash which surrounds a joint between the workpieces; permitting the end portions to cool; reheating the end portions to an elevated temperature below the fusion temperature of the workpieces; reclamping said workpieces at portions thereof spaced further from said welding flash; and subjecting at least one of the workpieces to a second compressive force acting in a direction to further upset the end portions of the workpieces and to thereby enlarge the welding flash so that, upon removal of the welding flash, at least the major part of the joint consists of metallic material whose metallurgical structure is the same as the metallurgical structure of the remainder of the workpieces.

5. A method of forming welded joints between the end portions of two metallic workpieces, comprising the steps of reducing the cross-sectional areas of the end portions; clamping each workpiece closely adjacent the end portion of reduced cross-sectional area; placing the clamped end portions in end-to-end abutment with each other; passing an electric current through the end portions of the workpieces to thereby heat the end portions to fusion temperature whereby the metallurgical structure of the end portions changes; subjecting at least one of the workpieces to a first compressive force acting in a direction to upset the end portions and to form a welding flash which surrounds a joint between the workpieces and whose cross-sectional area at least approximates the cross-sectional area of the remainder of the workpieces; reclamping said workpieces at portions thereof spaced further from said welding flash; and subjecting at least one of the workpieces to a second compressive force acting in a direction to further upset the end portions and to thereby enlarge the welding flash so that, upon removal of the welding flash, at last the major part of the joint consists of metallic material whose metallurgical structure is the same as the metallurgical structure of the remainder of the workpieces.

6. A method of forming welded joints between the end portions of two substantially round metallic workpieces, comprising the steps of reducing the cross-sectional areas of the end portions so that each end portion comprises a substantially cylindrical tip and a conical intermediate section which is inwardly adjacent to the respective tip; clamping each workpiece closely adjacent the end portion of reduced cross-sectional area; placing the tips in end-to-end abutment with each other; passing an electric current through the end portions of the workpieces to thereby heat the end portions to fusion temperature whereby the metallurgical structure of the end portions changes; subjecting at least one of the workpieces to a first compressive force acting in a direction to upset the end portions and to form a welding flash which surrounds a joint between the workpieces and whose cross-sectional area at least approximates the cross-sectional area of the remainder of the workpieces; reclamping said workpieces at portions thereof spaced further from said welding flash; and subjecting at least one of the workpieces to a second compressive force acting in a direction to further upset the end portions and to thereby enlarge the welding flash so that, upon removal of the welding flash, at least the major part of the joint consists of metallic material whose metallurgical structure is the same as the metallurgical structure of the remainder of the workpieces.

7. A method as set forth in claim 6, wherein said intermediate sections have conical surfaces whose inclination to the axes of the respective workpieces at least approximates 45 degrees.

8. A method of forming a welded joint between a pair of substantially round metallic workpieces, comprising the steps of clamping each workpiece closely adjacent one end thereof; placing the workpieces at the clamped ends thereof in end-to-end abutment with each other; passing an electric current through the abutting ends of the workpieces to thereby heat to fusion temperature such end portions of the workpieces which are immediately adjacent to the abutting ends thereof whereby the metallurgical structure of the end portions of the workpieces changes; subjecting at least one of the workpieces to a first compressive force acting in a direction to upset the end portions and to form a welding flash which surrounds a joint between the workpieces; reclamping said workpieces at portions thereof spaced further from said welding flash; and subjecting at least one of the workpieces to a second compressive force acting in a direction to move such one workpiece toward the other workpiece through a distance at least equal to 0.4 times the diameter of an end portion prior to the upsetting thereof and to thereby further upset the end portions of the workpieces so as to enlarge the welding flash whereby, upon removal of the welding flash, at least the major part of the joint consists of metallic material whose metallurgical structure is the same as the metallurgical structure of the remainder of the workpieces.

9. A method of forming a welded joint between a pair of round, polygonal and similar metallic workpieces, comprising the steps of clamping each workpiece closely adjacent one end thereof; placing the workpieces at the clamped ends thereof in end-to-end abutment with each other; passing an electric current through the abutting ends of the workpieces to thereby heat to fusion temperature such end portions of the workpieces which are immediately adjacent to the abutting ends thereof whereby the metallurgical structure of the end portions of the workpieces changes; subjecting at least one of the workpieces to a first compressive force acting in a direction to upset the end portions and to form a welding flash which surrounds a joint between the workpieces; reclamping said workpieces at portions thereof spaced further from said welding flash; and subjecting at least one of the workpieces to a second compressive force acting in a direction to further upset the end portions of the workpieces and to thereby enlarge the welding flash so that, upon removal of the welding flash, at least the major part of the joint consists of metallic material whose metallurgical structure is the same as the metallurgical structure of the remainder of the workpiece, the distance through which such one workpiece is moved in response to said second compressive force being at least equal to $$1.6 \frac{m}{n}$$

wherein $m$ is the cross-sectional area of an end portion in mm.$^2$ and wherein $n$ is the circumferential length of an end portion in mm. prior to upsetting of such end portions.

References Cited in the file of this patent
UNITED STATES PATENTS

| | | |
|---|---|---|
| 651,597 | Eyre | June 12, 1900 |
| 1,020,158 | Powers | Mar. 12, 1912 |
| 2,066,647 | Rodman | Jan. 5, 1937 |
| 2,085,049 | Spire | June 29, 1937 |
| 2,945,117 | Harris et al. | July 12, 1960 |
| 2,945,940 | Schlatter | July 19, 1960 |